United States Patent

[11] 3,630,137

| [72] | Inventors | Allen G. Stimson;<br>Carl H. Zirngible, both of Rochester, N.Y. |
|---|---|---|
| [21] | Appl. No. | 839,594 |
| [22] | Filed | July 7, 1969 |
| [45] | Patented | Dec. 28, 1971 |
| [73] | Assignee | Eastman Kodak Company<br>Rochester, N.Y. |

[54] CAMERA HAVING SHUTTER SPEED CONTROLLED BY LENS APERTURE
4 Claims, 14 Drawing Figs.

[52] U.S. Cl. ..................................................... 95/58, 95/55, 352/210
[51] Int. Cl. ..................................................... G03b 9/10
[50] Field of Search ........................................... 95/55, 60, 61, 58, 59; 352/210, 217

[56] References Cited
UNITED STATES PATENTS

| 1,011,593 | 12/1911 | Dudley | 352/210 |
|---|---|---|---|
| 1,012,344 | 12/1911 | England | 352/210 |
| 1,357,076 | 10/1920 | Myers et al. | 352/210 |
| 1,426,595 | 8/1922 | Patureau | 352/210 |
| 1,471,031 | 10/1923 | Johnston | 352/210 |

Primary Examiner—Samuel S. Matthews
Assistant Examiner—Monroe H. Hayes
Attorneys—Robert W. Hampton and Milton S. Sales ABSTRACT: A camera has an adjustable lens aperture and a shutter member movable in a given path across the optical axis. The shutter member has an aperture for selectively passing light admitted by the lens aperture for exposing the film. The shutter member, has an elongated opaque member extending across the shutter aperture and aligned with the lens aperture, the width of the opaque member being substantially equal to the minimum adjustment of the lens aperture. The opaque member has a plurality of cutouts for passing light to the film as the shutter aperture moves past the lens aperture.

PATENTED DEC 28 1971 3,630,137

INVENTORS:
ALLEN G. STIMSON
CARL H. ZIRNGIBLE

*Milton S Sales*

*Robert W Hampton*

ATTORNEYS

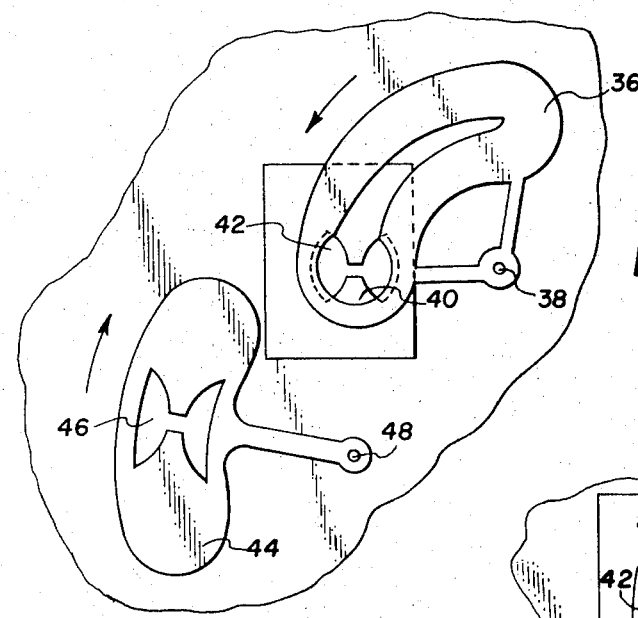
FIG. 7
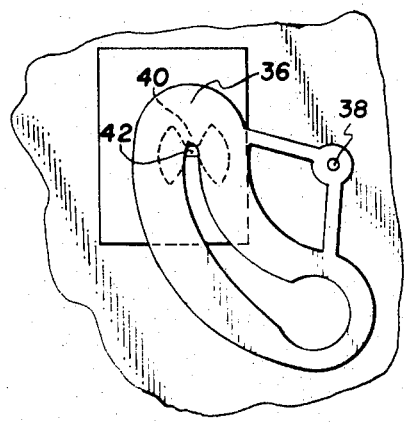
FIG. 8
FIG. 9
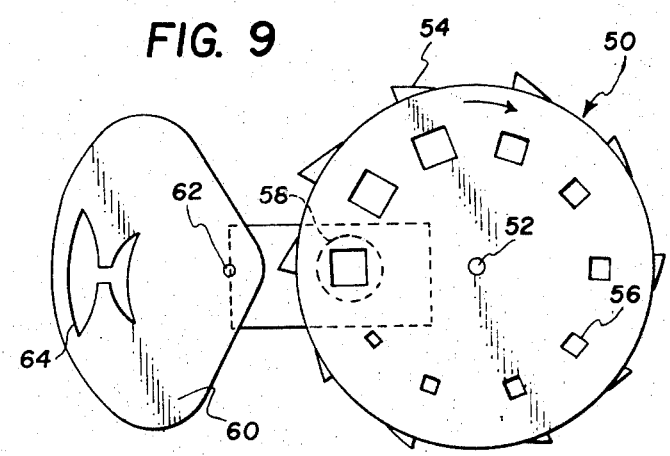
INVENTORS
ALLEN G. STIMSON
CARL H. ZIRNGIBLE
BY Milton S. Sales
Robert W. Hampton
ATTORNEYS

INVENTORS:
ALLEN G. STIMSON
CARL H. ZIRNGIBLE

BY *Milton S. Sales*
*Robert W. Hampton*

ATTORNEYS

CAMERA HAVING SHUTTER SPEED CONTROLLED BY LENS APERTURE

BACKGROUND OF THE INVENTION

1. Field of the Invention

The present invention relates generally to cameras having a lens diaphragm aperture and a shutter aperture member in which exposure is accomplished by transporting the shutter aperture member across the lens diaphragm aperture and exposure control is effected by varying the size of the lens aperture, and more particularly, to a camera wherein the effective shape of the shutter aperture is a function of the size of the lens aperture.

2. Description of the Prior Art

Generally, inexpensive cameras have mechanism for adjusting the exposure time by adjusting either the lens diaphragm aperture or the shutter aperture, with only more expensive cameras possessing the flexibility provided by being adapted for adjustment of both apertures. Adjustment of only one of the apertures results in a relatively narrow range of exposure duration control, the maximum change in total exposure time being only of the order of 2 to 1.

SUMMARY OF THE INVENTION

It is an object of the present invention to provide a novel shutter member for cameras, the shutter member being movable through a path across a lens aperture having an adjustable dimension perpendicular to such path to define an exposure aperture. The shutter member is provided with a shutter aperture shaped to effect a reduction in its effective dimension parallel to said path as the lens aperture's adjustable dimension is reduced.

It is another object of the present invention to shape the shutter aperture described above so that movement of the shutter member across the lens aperture at a velocity $v$ establishes an exposure duration equal to $2d/xv$ where the lens aperture has a maximum dimension $d/x$ parallel to the path at any adjustment.

In a preferred embodiment of the present invention, a movable shutter member is provided with an hourglass-shaped shutter aperture having a first pair of edges substantially parallel to the path of the shutter member's movement, a second pair of edges substantially perpendicular to and contained between said first pair of edges and a third set of edges connecting the first and second pair of edges. The third set of edges may be arcuate.

BRIEF DESCRIPTION OF THE DRAWING

In the detailed description of the preferred embodiments of the invention presented below, reference is made to the accompanying schematic drawing in which:

FIG. 7 is a front view of a single-vane masked diaphragm and a shutter aperture member;

FIG. 8 is a view of the mask and the single-vane diaphragm of FIG. 7;

FIG. 9 is a front view of a Waterhouse-stop wheel and the shutter aperture member of another embodiment;

DESCRIPTION OF THE PREFERRED EMBODIMENT

Because photographic cameras are well known, the present description will be directed in particular to elements forming part of, or cooperating more directly with, the present invention, camera elements not specifically shown or described herein being understood to be selectable from those known in the art.

Figure 1:
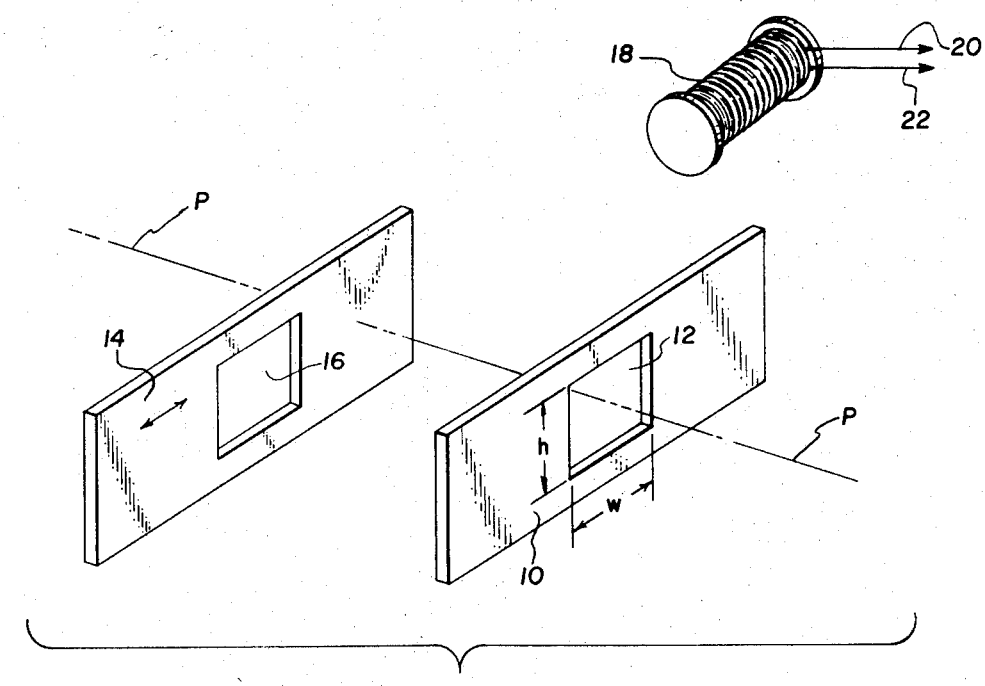
FIG. 1 shows conventional lens and shutter member.

FIG. 1 shows a prior art exposure means consisting generally of a lens aperture member 10 which is mounted in a camera housing, not shown. An adjustable-size lens aperture 12 is defined by lens aperture plate 10 and is so oriented that light rays P, entering the camera through its optics, pass through lens aperture 12. A shutter aperture plate 14 is slidably mounted in the camera housing in any well-known manner. A substantially square shutter aperture 16 is defined by shutter aperture plate 14. Any well-known means may be used to move shutter aperture plate 14 across lens aperture plate 10. One such means has been illustrated as an electromagnet 18 with electrical terminals 20 and 22. When an exposure is desired, electromagnet 18 is energized, thereby exerting an attractive force on shutter plate 14 to draw the shutter plate across lens plate 10. As shutter aperture 16 begins to overlap lens aperture 12, light rays P pass through apertures 12 and 16, thereby initiating the exposure. Further movement of shutter plate 14 increases the amount of light passing through shutter aperture 16 until lens aperture 12 is fully uncovered. If the two apertures are equal in width, the amount of light passing through shutter aperture 16 then begins decreasing as shutter aperture plate 14 moves closer to magnet 18 until finally the exposure is terminated. As an example, the combination of shutter aperture 16 and lens aperture 12 as shown in FIG. 1 might result in an $f/2.0$ lens with a total exposure time of one-sixtieth second It is well understood that as aperture 12 is made shorter, the duration of exposure will also decrease, the total shutter-open time being proportional to $2d$ where the width of aperture 12 and the width of aperture 16 each equal $d$. However, with a conventionally shaped shutter aperture, the maximum change in effective exposure time is only of the order of 2:1 or from one-sixtieth to one one-twentyfifth second. Of course, the speed of plate 14 will also determine the exposure time, but it will be assumed that this is constant.

Figure 2:
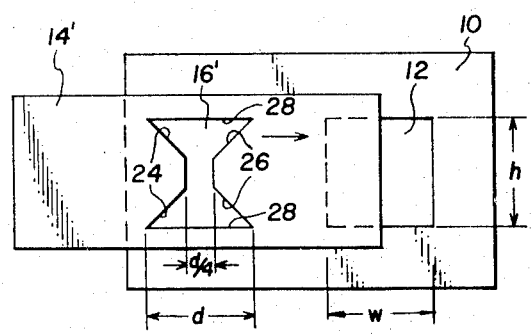
FIG. 2—5 are front views of lens and shutter aperture members.

As shown in FIG. 2, an improvement in exposure control is achieved by utilizing a shutter aperture 16' which, unlike aperture 16 of FIG. 1, is not square in shape. Aperture 16' is bounded by edges 24, 26 and 28 of plate 14'. Edges 28 are parallel to each other and parallel to the direction of movement of shutter exposure plate 14' during exposure. Edges 24 and 26 intersect edges 28 at acute angles.

Figure 3:
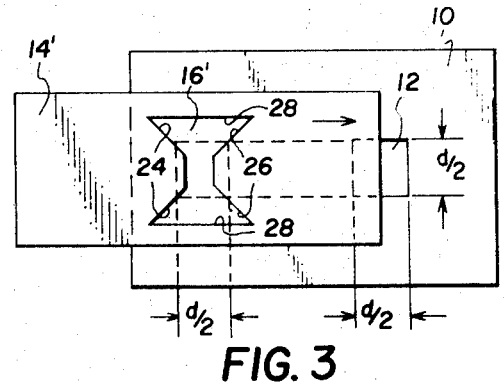
Figure 4:
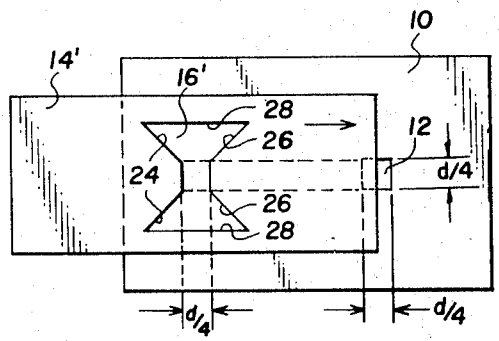

As shown in FIG. 2, with the same size lens aperture 12, the total exposure time $t$ will be proportional to $2d$, the distance shutter aperture plate 14' is moved while aperture 12 is uncovered, and the combination will again be a geometric $f/2.0$ lens at one-sixtieth sec. If the lens aperture height $h$ and width $w$ were reduced to $d/2$ in the prior art mechanisms, shutter plate 14' would move $3d/2$ for total exposure. The total exposure time would be reduced in the ratio of $2d$ to $3d/2$ or 1.3:1. As shown in FIG 3, reduction in the height and width of lens aperture 12 from $d$ to $d/2$ in the present invention, will also reduce the effective size of shutter aperture 16' as not all of shutter aperture 16' will be in the path of the light passing through lens aperture 12. The edges 24 and 26 are at 45° angles to edges 28, reducing the effective height and width of shutter aperture 16' from $d$ to $d/2$. The net effect will be a further reduction in the distance which shutter aperture plate 14' must be moved for total exposure from that reduction achieved by reducing the size of lens aperture 12. The total exposure time will now be proportional to $d$ as compared to the prior art reduction to $3d/2$ and the change in exposure time is of the order of 2:1 as compared to 1.3:1. The combination will result in an $f/4.0$ lens with a total exposure time of one one-twentyfifth seconds. Further reduction in the height and width of lens aperture 12 to $d/4$ as shown in FIG. 4, results in a further reduction in effective shutter aperture size to $d/4$. Without the change in effective shutter aperture size resulting from the design of this invention, the prior art would have achieved a reduction in required movement of lens aperture plate 1 from $2d$ to $5d/4$, and a resultant decrease in total exposure time of the order of 1.6:1. The present invention achieves a reduction in required movement of lens aperture plate 14 from $2d$ to $d/2$. Total exposure time is then proportional to $d/2$, a resultant decrease of the order of 4:1. The combination results in an $f/8$ lens with a total shutter open time of 1/250 seconds.

Figure 5:
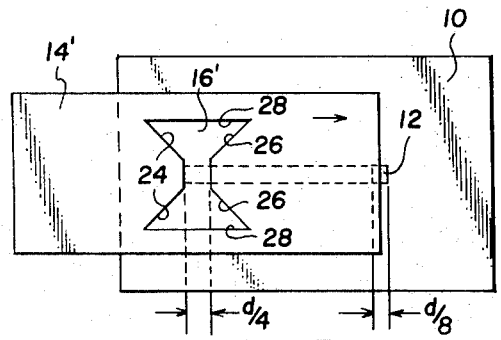

It is well known that shutter speed is infrequently adjusted when total exposure time is less than 1/250 seconds. Thus, for further diaphragming of lens aperture 12 to a height and width of $d/8$ as in FIG. 5, the opening of shutter aperture 16 remains $d/4$ and the effective width of shutter aperture 5 is thus $d/4$. The total exposure time is proportional to $(d/8 + d/4)$ and the combination results in an $f/16$ lens with a total exposure time of 1/312 second.

It is seen that use of the irregular shutter aperture configuration of FIG. 2 has resulted in a change in total open time from one-sixtieth to 1/312 second or about 5:1, whereas the prior art configuration of FIG. 1 resulted in a change of the order of 2:1. However, it is obvious that the shutter aperture configuration of FIG. 2 is not as efficient as that of shutter aperture configuration of FIG. 1 when the lens aperture is wide open, since edges 24 and 26 of shutter aperture 16' prevent some light from passing to the film. This difference will be reduced as the lens aperture is reduced and will be eliminated for exposure settings in which the shutter aperture width remains constant. This could be corrected by utilizing a larger shutter aperture which would result in a longer shutter open time, thus permitting the collection of the same amount of light as collected by shutter aperture 16 of FIG. 1. A configuration such as that of shutter aperture 30, shown in FIG. 6, will improve the efficiency of the wide range exposure combination in that it allows more light to be collected when lens aperture 12 (FIG. 2) is wide open than does shutter aperture 16' of FIG. 2 Edges 32 and 34 of shutter aperture 30 have a greater slope than edges 24 and 26 of shutter aperture 16' when the lens aperture is large, as in FIG. 2. Thus, shutter aperture 30 has a smaller change in effective width than shutter aperture 16' (FIG. 2) for a corresponding change in lens aperture height $h$. The rate of total exposure time $t$ is thus smaller with shutter aperture 13 than with shutter aperture 16' for large lens apertures. Conversely, edges 32 and 34 of shutter aperture 30 have a lesser slope than edges 24 and 26 of shutter aperture 16' when the lens aperture is in the intermediate range between that shown in FIGS. 3 and 4. Thus, shutter aperture 30 will experience a larger change in effective width than shutter aperture 16' for a corresponding change in lens aperture height $h$. The rate of total exposure time decrease is thus greater in shutter aperture 30 than shutter aperture 16' for intermediate sized lens apertures. This results in another advantage for lens aperture 30 when compared either to lens aperture 16' (FIG. 2) or the prior art. It is relatively easy to accurately control exposure by means of the lens aperture when that aperture is large, and proportionately more difficult as the aperture is reduced in size. Shutter aperture 30 assists in that control, since it becomes more effective as the lens aperture decreases in size.

The configuration of shutter aperture 16' or 30 produces an unexpected advantage in that flash synchronization does not change with changes in shutter speed. It is conventional in the photographic field to trigger a photoflash lamp by means of a contact on a movable shutter plate, such as plate 14' as used in this invention. However, such triggering occurs at a fixed point in the path of the shutter plate. Thus, a change in shutter speed by changing the exposure time or the transportation speed means that the maximum illumination from the photoflash lamp will not occur at the optimum time, i.e., when the center of the shutter aperture crosses the center of the lens aperture. Change in shutter speed is accomplished in this invention by a symmetric change in aperture size about the center of the shutter aperture. Therefore, the center of the shutter aperture will always cross the center of the lens aperture at the same time in the exposure cycle, and the photoflash lamp may be triggered so as to produce maximum light output at this instant.

Figure 6:
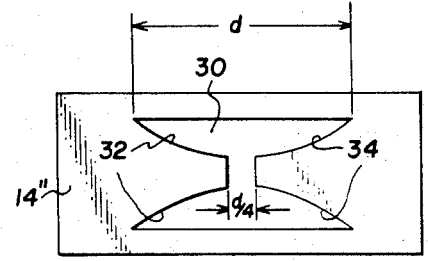
FIG. 6 is a front view of another embodiment of a shutter member.

The improved shutter aperture configuration 30 may be used in conjunction with existing means for controlling the size of the lens aperture. One such combination is shown in FIG. 7, wherein a conventional single-vane diaphragm 36 is rotatably mounted on a pin 38 within the camera housing (not shown). A fixed mask 40 cooperates with diaphragm vane 36 to provide a lens aperture 42 through which the film may be exposed. A shutter plate 44, containing therein a shutter aperture 46 of the same general configuration as aperture 30 of FIG. 6 is rotatably mounted on a fixed pin 48.

When the operator desires to expose the film, diaphragm vane 36 will rotate about pin 38 under the control of any well-known manual or automatic exposure control system. When the lens aperture is wide open as in FIG. 7, rotation of shutter plate 44 across diaphragm vane 36 will result in a $f/2.3$ lens with a total exposure time of 1/40 second. If vane 36 is rotated to reduce the lens aperture to that of the aperture shown in FIG. 8, rotation of shutter plate 44 across diaphragm vane 36 will now result in a $f/16$ lens with a total exposure time of 1/200 second. The combination of the shutter aperture configuration of FIG. 6 and a conventional single-vane diaphragm produces a change in exposure time of 5:1 or better, rather than the ratio of 2:1 obtainable with conventional shutter apertures.

A similar improvement in total exposure time may be achieved by use of a conventional Waterhouse-stop wheel 50 as shown in FIG. 9. Wheel 50 is rotatably mounted on fixed pin 52 and contains ratchet teeth 54 for use with a conventional magnetic stop mechanism. Wheel 50 also contains therein a series of lens apertures 56 which are selectively positionable over a lens opening 58 as wheel 50 is rotated under control of any well-known exposure control system. A shutter blade 60 is rotatably mounted on a fixed pin 62 and contains therein a shutter aperture 64 of the configuration of aperture 30 of FIG. 6.

As wheel 50 rotates, the lens aperture is reduced in size until the magnetic stop engages one of the ratchet teeth 54. Shutter blade 60 is then rotated across lens aperture 58 to expose the film. As with the single-vane diaphragm, a reduction in total exposure time of 5:1 or better is achievable by use of the shutter aperture configuration of this invention.

Figure 10:
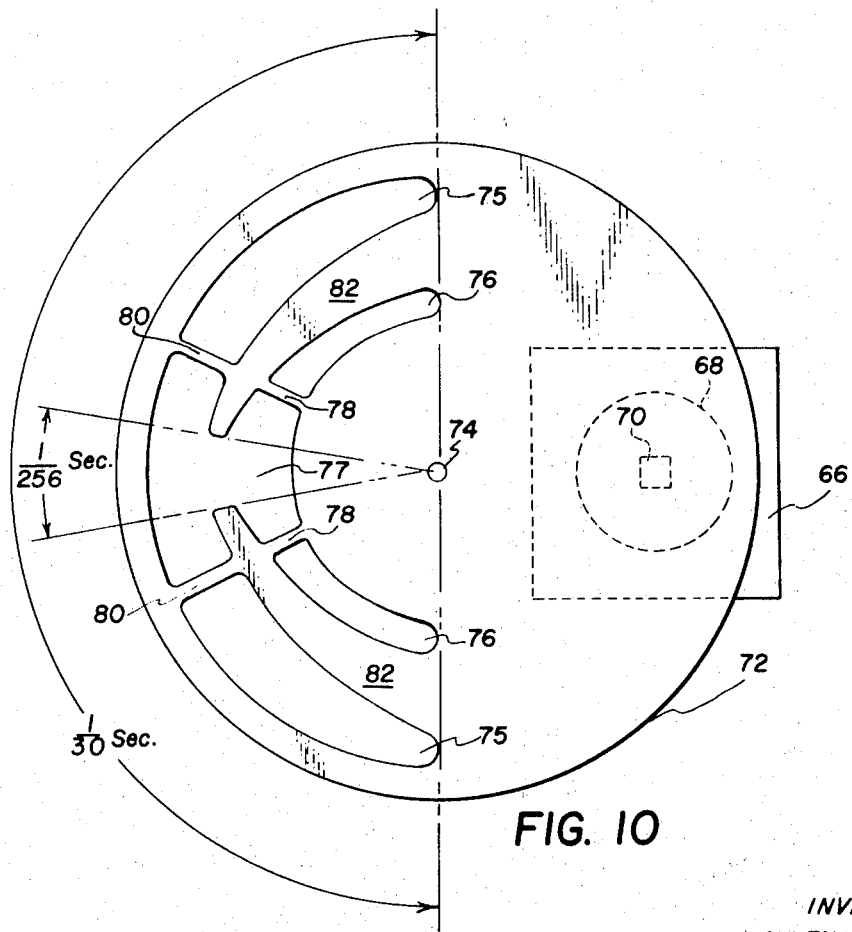
FIG. 10 is a front view of lens and shutter aperture members for a movie camera.

The advantages inherent in this improved shutter aperture design also result when a similar aperture design, as shown in FIG. 10, is used in a movie camera. A lens aperture plate 66 is fixedly mounted in the camera housing, not shown. The lens aperture is continuously adjustable from a maximum opening 68 to a minimum opening 70 in any well-known manner. A rotary shutter plate 72 is mounted for rotation about a fixed axis 74. A shutter aperture consisting of openings 75–77 is defined by shutter plate 72. Two webs 78 are located between openings 76 and 77 and two webs 80 are located between openings 75 and 77 to add rigidity to shutter aperture plate 72. Two projections 82 are located between openings 75 and 76 and project into opening 77.

As the lens aperture is reduced from the maximum aperture 68 to the minimum aperture 70, the total exposure time will be reduced from that required for rotation of shutter plate 72 to move the entire open part of the shutter aperture over the lens aperture to that required for rotation of shutter plate 72 to move that portion of opening 77 which lies between the ends of projections 82 over the lens aperture. For the configuration shown in FIG. 10, this will result in a reduction from 1/30 second to 1/256 second, an 8:1 reduction in total exposure time with no change in the velocity of the rotary shutter. The reduction afforded by the prior art, in the absence of a change in velocity of the rotary shutter or size of the shutter, would be of the order of 1.1:1, being limited by the shutter aperture angle. This increase in exposure time range is particularly useful when high speed films are used or when the image definition would be impaired by diffraction when a lens aperture smaller than f/11 is used on short focal length lenses.

In motion picture photography, high speed film requires a reduction in the shutter angle, resulting in a corresponding reduction in exposure time. For instance, a 160° shutter angle gives an exposure time of 1/40 second while a 30° shutter angle results in an exposure time of 1/212 second. However, exposures of extremely short total time duration such as are achieved by the improved shutter configuration of this invention are subject to motion discontinuity or "jumpiness" caused by excessive image sharpness. In order to reduce these detrimental effects, projection 82 of FIG. 10 may be made of neutral density material, or light may be permitted to leak around projections 82 to produce a more diffuse image.

FIGS. 11—14 show another approach to the solution of the dual problems of image sharpness and discontinuity associated with the use of high speed film in a motion picture camera. As discussed above, there is a minimum acceptable value for the lens aperture setting. Below such minimum, diffraction will impair image definition. If such minimum is not sufficiently small for proper exposure, as would be the case where high speed film is used, the shutter aperture must be decreased, causing the problem of image "jumpiness" discussed above.

Figure 11:
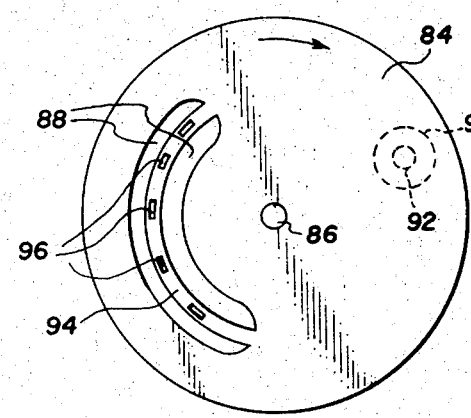
FIG. 11 is a front view of a shutter member for use in a motion picture camera.

FIG. 11 shows a shutter member 84 which is rotatable about pin 86 at a constant frequency. Member 84 defines a shutter aperture 88 which passes over an adjustable size lens aperture having a maximum size represented at 90 and a minimum size represented at 92. Alternately, shutter aperture 88 may take the form of that of aperture 30 of FIG. 6.

A narrow, opaque member 94 is carried in aperture 88 at a constant radius from pin 86. Opaque member 94 is positioned so that light entering through the lens aperture when it is at its maximum adjustment 90 will pass around member 94, effecting an exposure time $t_o$. However, when the lens aperture is reduced to its minimum 92, substantially all light would be blocked by member 94 were it not for transparent areas 96 in member 94. Transparent areas 96 effectively make multiple exposures, each of short time duration $t_n$, on one film frame during one revolution of shutter member 84.

Figure 12:
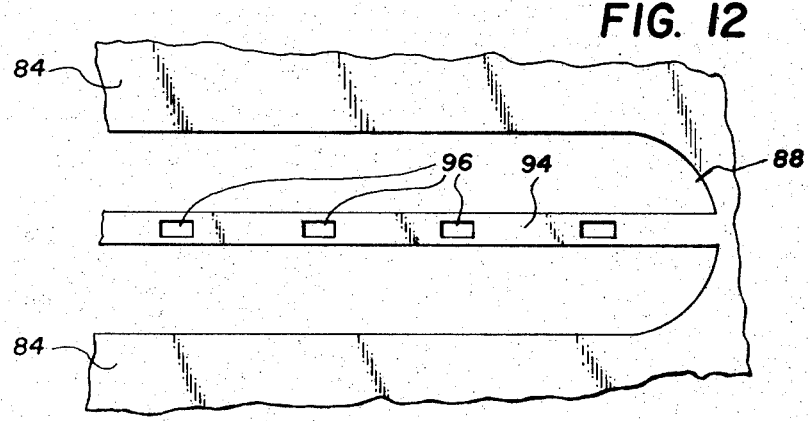
FIGS. 12–14 are enlarged views of shutter openings in the shutter member of FIG. 11.

Transparent areas 96 may be better seen in FIG. 12 which shows an enlarged portion of opaque area 94. Tests have been conducted with a conventional shutter effecting a single, short time exposure of 1/250 second, which corresponds to a 30° shutter angle. The results showed excessively sharp and "jumpy" images. By using a shutter member as shown in FIGS. 11 and 12 having six openings, each of 5° shutter angle, the "jumpiness" was eliminated and the resulting multiple images were scarcely observable and not objectionable.

Figure 13:
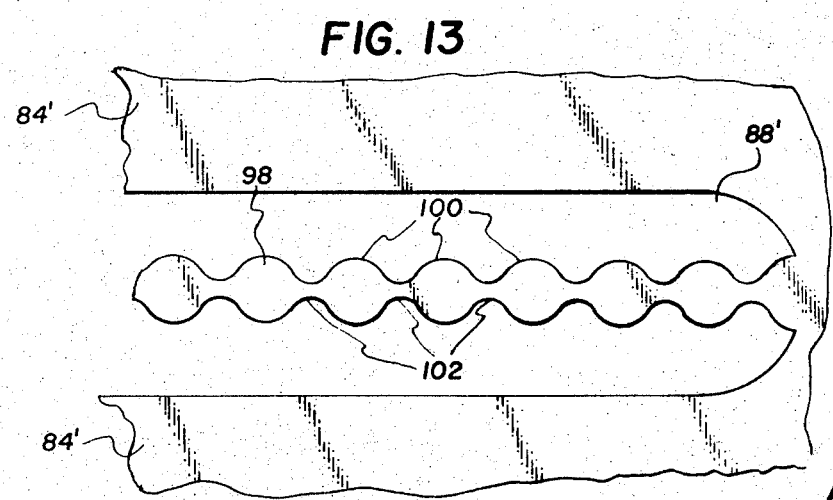

FIG. 13 shows a modification in the shape of opaque area 94 of FIGS. 11 and 12. This embodiment has an opaque area 98 having alternating wide areas 100 and narrow areas 102 rather than openings such as 96 in FIGS. 11 and 12. This shape minimizes the effect of the multiple images by slightly blurring the images.

Figure 14:
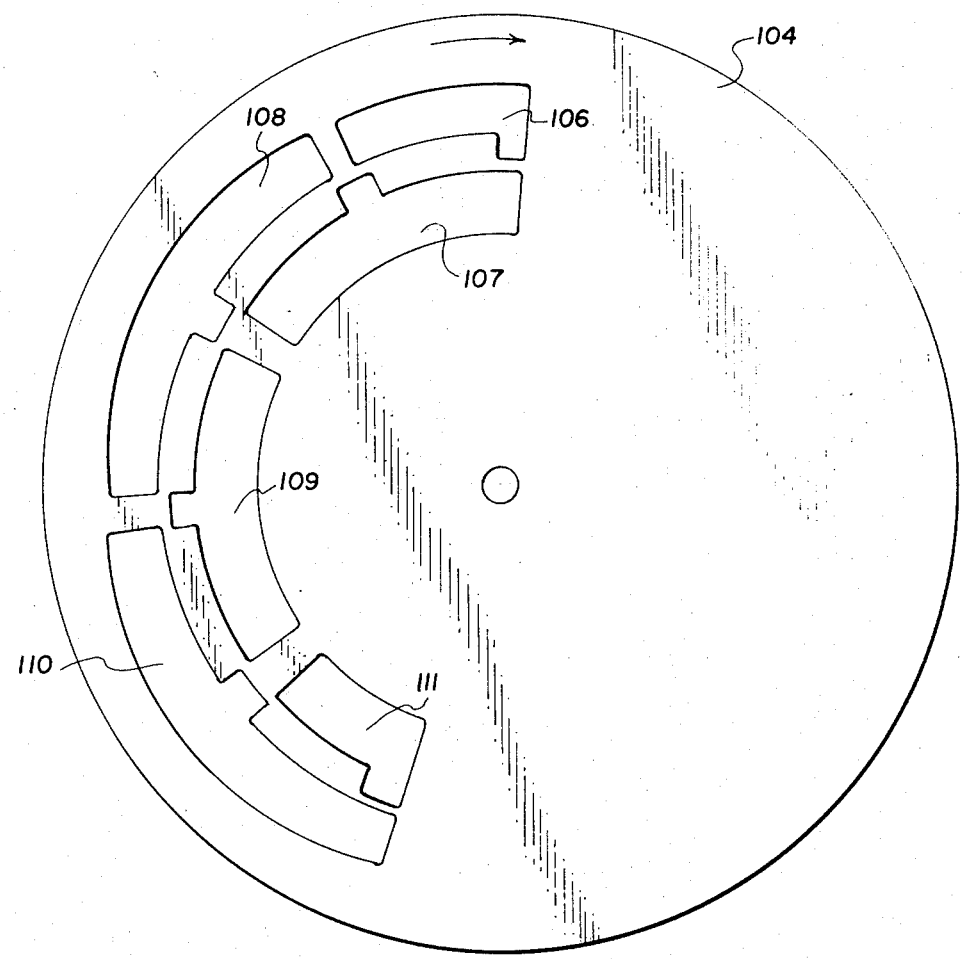

The embodiment shown in FIG. 14 has an aperture member 104 which defines a series of slots 106—111 which form an exposure aperture. The effect of this embodiment is the same as that of the embodiment shown in FIGS. 11 and 12, but it is somewhat easier to manufacture.

The invention has been described in detail with particular reference to a preferred embodiment thereof, but it will be understood that variations and modifications can be effected within the spirit and scope of the invention.

We claim:

1. In a camera having a shutter member movable along a predetermined path; means defining an adjustable-size lens aperture; means for adjusting the size of said lens aperture, said lens aperture, at any adjustment thereof, having a maximum dimension $w$ perpendicular to said path; the improvement comprising means on said shutter member defining a shutter aperture cooperating with said lens aperture during movement of said shutter member through said path to establish a single-exposure interval for a period of time $t_o$ when $w$ is larger than a predetermined value and for establishing a series of short exposure intervals for periods of time $t_1$, $t_2$,..., $t_1$ when $w$ is smaller than said predetermined value, where the summation of the exposure intervals from $t_1$ to $t_n$ is less than the exposure interval $t_o$.

2. In a camera having means defining a shutter member movable along a predetermined path, said shutter member defining a shutter aperture; an adjustable-size lens aperture; means for adjusting the size of said lens aperture in a direction perpendicular to said path between a maximum and a minimum adjustment, the improvement comprising: (1) an elongated, opaque member carried by said shutter member aligned with said path and dividing said shutter aperture into two portions, said opaque member having a dimension perpendicular to said path substantially equal to the minimum adjustment of said lens aperture and (2) a plurality of transparent areas at least partially defined by said opaque member, said transparent areas being aligned with said path for cooperating with said lens aperture at its minimum adjustment during movement of said shutter member through said path to establish a series of short exposure intervals.

3. The improvement defined in claim 2 wherein said plurality of transparent areas are bounded on all sides by said opaque member.

4. The improvement defined in claim 2 wherein said opaque member has alternately wide and narrow portions, said narrow portions defining in part said transparent areas.

* * * * *